H. W. REYNOLDS & J. A. SMITH.
NIPPLE FLANGE.
APPLICATION FILED MAR. 27, 1908.
943,123.
Patented Dec. 14, 1909.
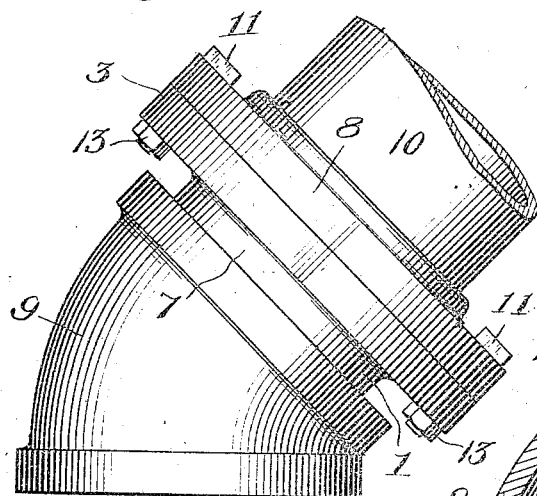
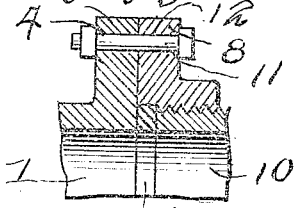
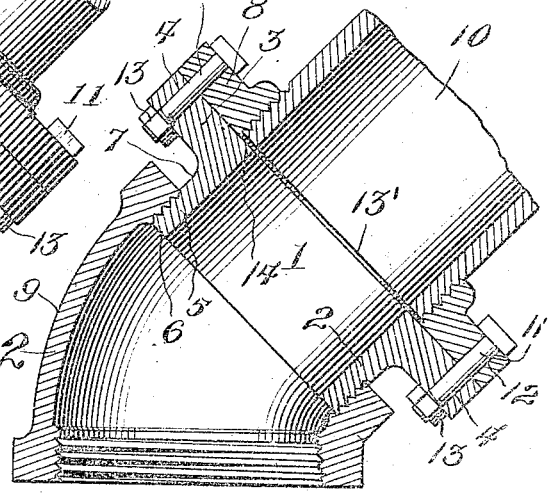
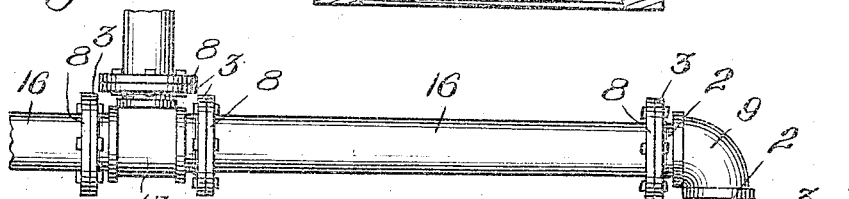
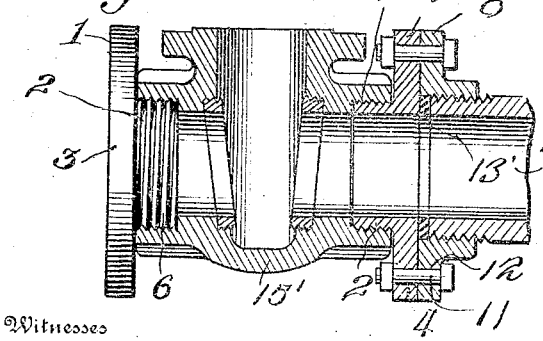
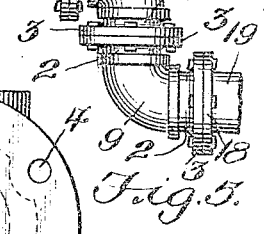
Witnesses
Inventors
Howard W. Reynolds,
John A. Smith,
By Victor J. Evans,
Attorney

UNITED STATES PATENT OFFICE.

HOWARD W. REYNOLDS, OF NEW YORK, N. Y., AND JOHN A. SMITH, OF ARLINGTON, NEW JERSEY.

NIPPLE-FLANGE.

943,123.

Specification of Letters Patent. Patented Dec. 14, 1909.

Application filed March 27, 1908. Serial No. 423,654.

*To all whom it may concern:*

Be it known that we, HOWARD W. REYNOLDS, a citizen of the United States, residing at New York, in the county of New York and State of New York, and JOHN A. SMITH, a citizen of the United States, residing at Arlington, in the county of Hudson and State of New Jersey, have invented new and useful Improvements in Nipple-Flanges, of which the following is a specification.

This invention relates generally to pipe couplings, and particularly to couplings of the type known as " screw flanges " for coupling pipe sections and fittings, such as elbows, crosses, tees, gate or globe valves, etc., with each other in the erection of steam, water, oil or gas pipe lines.

The primary object of the present invention is to provide a novel construction of coupling which may be termed a "nipple-flange" and is adapted to be interchangeably employed in the erection or repair of pipe lines for the purpose of connecting the different pipes and fittings in such a manner as to reduce the cost of construction, effect a saving of time and labor and facilitate and render easier the connection of parts in both installing and repairing a pipe line of any irregular character or considerable length.

A further object of the invention is to provide a coupling of this character which may be used in conjunction with the ordinary threaded flange or integral flange upon one of the parts to be coupled, and by the use of which the ordinary threaded nipples and unions may be dispensed with and tighter and stronger joints secured.

The invention consists of the features of construction, combination and arrangement of parts hereinafter fully described and claimed, reference being had to the accompanying drawing, in which:—

Figure 1 is a view in elevation showing the use of the improved nipple flange in conjunction with an ordinary threaded flange for coupling an elbow and pipe. Fig. 2 is a longitudinal section of the same. Fig. 3 is an elevation of a portion of a pipe line showing the use of the nipple-flange in coupling the various parts thereof. Fig. 4 is a vertical longitudinal section through a valve casing showing one of the applied nipple-flanges in elevation and the other in section.

Fig. 5 is an end elevation of the valve casing shown in Fig. 4 showing the nipple-flange applied and coupling a pipe section thereto, said flange being partly in section and partly in elevation to better disclose the construction thereof. Fig. 6 is an enlarged detail section showing the arrangement of the packing ring.

Referring to the drawing, 1 designates the nipple-flange or coupling constructed in accordance with the present invention, said coupling embodying the nipple proper 2 and flange proper 3, which latter is formed with openings 4 for the passage of coupling bolts. In the process of manufacture, the nipple and flange are formed integrally as a unitary article of manufacture, and the outer portion 5 of the nipple is uniformly tapered and externally threaded, as at 6, to fit within the threaded end of the elbow, valve or other element which is to be connected with the adjoining element of the pipe line. In the form of the invention shown in detail in Figs. 1 and 2, the inner portion 7 of the outer surface of the nipple is left smooth or unthreaded, so that when the same is applied to the elbow, valve or other element engaged thereby a space will be left between the end of such element and the adjacent side of the flange 3 for the reception of the nuts of the coupling bolts and free manipulation of the wrench or other tool employed in applying and removing the same.

In Figs. 1 and 2, the improved coupling is shown employed for use in connection with an ordinary "threaded flange" 8 for coupling an elbow 9 with a pipe section 10, the ends of the elbow being internally threaded and the end of the pipe externally threaded in the usual manner. It will be observed that in such application the threaded portion of the nipple is inserted within and engaged with one of the threaded ends of the elbow 9, while the flange 8 is engaged with the exteriorly threaded end of the pipe 10 with its outer end projecting slightly beyond the end of the pipe and lies in abutting contact with the outer face of the flange 3 of the improved coupling. Bolts 11 pass through the openings 4 in the flange 3 and through corresponding openings 12 in the flange 8 and couple the parts together, the securing nuts 13 applied to the threaded ends the bolts lying partially within the space formed beyond the surface 7 of the nipple between the end of the elbow 9 and the adjacent side of the flange 3 for the purpose before described. The construction of the nipple and flange as a single or unitary coupling element, permits the bore or passage of the nipple to be made of the same diameter as the bore or passage of the pipe 10, so that a shoulder 14 is formed by the outer end of the nipple below the base of the flange 3, between which shoulder and the end of the pipe 10 a packing washer or gasket 13' may be clamped and engaged with the projecting threaded portion of the ring flange to secure an absolutely tight joint.

Fig. 3 shows the use of the invention in coupling a tee 15 with the ends of adjacent pipe sections 16, and also for coupling elbows with each other and with the associated pipe sections, while Fig. 4 shows the use of the invention in connection with a gate or globe valve 15'. The ends of the T like the ends of the casing of the valve are tapered and internally threaded, as at 17. The nipples of the improved couplings are inserted in and engaged with such threaded portions 17 and the flanges 3 are coupled with the threaded flanges 8 upon the proximate ends of the pipes 16. In Fig. 4 we have shown a slight departure in the construction of the nipple-flange from that disclosed in Figs. 1, 2 and 3, in that the entire external surface of the nipple is threaded but this operation in the construction, while desirable under some conditions, is not absolutely essential. By reference to Fig. 3 it will be seen that two adjacent elbows 9 may be coupled together by the employment of two of the improved couplings, while each elbow may be coupled to the end of an adjacent pipe section by the use of one of the improved couplings and an ordinary threaded flange 8. In this figure we have also shown one of the elbows 9 connected by one of the improved nipple-flanges with an integral flange 18 on a pipe section 19, it being understood that the improved coupling may be used in connection with one of the ordinary threaded flanges 8 for coupling an elbow, valve casing or the like with a pipe or in conjunction with an integral flange upon the end of the pipe for a like purpose. The device is thus equally well adapted for coupling a wrought iron pipe in connection with a threaded flange to a fitting or coupling a cast pipe having an integral coupling flange with a fitting.

In practice, the improved nipple-flanges or couplings constituting the subject-matter of the invention may be employed substantially in the manner illustrated for coupling pipes and various fittings, including in addition to the parts before described tees, crosses and other like internally threaded parts which are intended to be coupled with other externally threaded or flanged parts, and they are also intended to be made of "standard" strength, "extra strong" and "double extra strong" to meet the various requirements of service for different pressures. It is also to be understood that the couplings are to be made of the standard sizes and threaded in the standard manner so as to render them interchangeably applicable for use with different sized pipes and fittings for coupling internally and externally threaded or flanged parts in the manner described.

As indicating one of the many advantages incident to the use of the invention, it may be stated that when a line of screwed pipe is laid starting at both extreme ends and meeting in the middle, it often becomes quite necessary to substitute ordinary screw flanges for a union in order to make proper connections, such union being employed for connecting the meeting ends of two pipe sections extending, for instance, between a valve and an elbow or other fitting. By the use of our improved coupling a single pipe section may be employed and connected at its ends with such fittings, thus dispensing with the necessity of making the pipe in two sections, as well as the necessity of employing a union. Also by the use of the present invention, the employment of ordinary independent threaded nipples in connection with threaded flanges and the like may be avoided with obvious advantages. It will therefore be apparent that in installing or repairing a pipe line having a number of elbows or fittings, the use of couplings embodying our invention will reduce the amount of time and labor required to connect the parts and at the same time form stronger and tighter joints.

Having thus fully described the invention, what is claimed as new is:—

Means for connecting standard pipes and fittings, comprising an externally threaded conductor, an internally threaded conductor, an internally threaded ring flange engaging the external threads of the first-named conductor and having a plane outer abutting face projecting slightly beyond the end of the same, an externally threaded nipple engaging the internal threads of the other conductor, said nipple being provided with a plane outer end formed with a flange integral therewith and having a plane outer face flush with said end of the nipple and abutting flatly against the outer face of the ring flange beyond the circumference of the nipple, said nipple and integral flange being provided with a bore extending continuously therethrough and of uniform diameter from end to end and corresponding in diameter to the bore of the externally threaded conductor, a packing ring or gasket between the end of the externally threaded conductor and outer end of the nipple and resting against the projecting threaded portion of the ring flange, and bolts uniting said flanges.

In testimony whereof we affix our signatures in presence of two witnesses.

HOWARD W. REYNOLDS.
JOHN A. SMITH.

Witnesses:
WILLIAM H. LUSK.
MARY B. LETTENBERGER.